United States Patent
Bursell et al.

(10) Patent No.: US 12,169,552 B2
(45) Date of Patent: Dec. 17, 2024

(54) IMPLEMENTING TRUSTED CLIENTS USING SECURE EXECUTION ENVIRONMENTS

(71) Applicant: Red Hat, Inc., Raleigh, NC (US)

(72) Inventors: Michael Hingston McLaughlin Bursell, Farnborough (GB); Axel Simon, Farnborough (GB); Benjamin G. Fischer, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 290 days.

(21) Appl. No.: 17/095,313

(22) Filed: Nov. 11, 2020

(65) Prior Publication Data

US 2022/0147616 A1    May 12, 2022

(51) Int. Cl.
```
H04L 29/06      (2006.01)
A63F 13/35      (2014.01)
A63F 13/71      (2014.01)
G06F 21/53      (2013.01)
G06F 21/62      (2013.01)
```

(52) U.S. Cl.
CPC .............. *G06F 21/53* (2013.01); *A63F 13/35* (2014.09); *A63F 13/71* (2014.09); *G06F 21/6245* (2013.01)

(58) Field of Classification Search
CPC ...... G06F 21/53; G06F 21/6245; A63F 13/35; A63F 13/71
See application file for complete search history.

(56) References Cited

U.S. PATENT DOCUMENTS

| | | | | |
|---|---|---|---|---|
| 6,463,535 B1 * | 10/2002 | Drews | ................... | G06F 21/575 |
| | | | | 713/176 |
| 7,288,027 B2 * | 10/2007 | Overton | ................... | A63F 13/75 |
| | | | | 463/43 |
| 8,244,804 B1 * | 8/2012 | Casselman | .............. | A63F 13/46 |
| | | | | 707/705 |
| 8,966,267 B1 * | 2/2015 | Pahl | ...................... | H04L 9/3268 |
| | | | | 713/171 |
| 9,224,259 B1 * | 12/2015 | Miller | ................. | G07F 17/3234 |
| 9,805,196 B2 * | 10/2017 | Ray | ........................ | H04L 9/3234 |
| 10,366,991 B1 * | 7/2019 | Ting | .................... | H01L 27/0886 |
| 10,396,991 B2 * | 8/2019 | Arasu | ..................... | G06F 21/78 |

(Continued)

OTHER PUBLICATIONS

Bauman, Erick and Lin, Zhiqiang, The University of Texas at Dallas, "A Case for Protecting Computer Games With SGX", Dec. 2016, 6 pages.

*Primary Examiner* — Shin-Hon (Eric) Chen
(74) *Attorney, Agent, or Firm* — Womble Bond Dickinson (US) LLP (57) ABSTRACT

Systems and methods for implementing trusted clients using secure execution environments. An example method comprises: receiving, by a server, a measurement from a client application running in a secure execution environment implemented by a client computing device; responsive to validating the measurement, transmitting a first confidential data item to the client application running in the secure execution environment; receiving, from the client application running in the secure execution environment, a second confidential data item derived from a local state of the client application modified by the first confidential data item; and updating, in view of the second confidential data item, a local state of a server application.

6 Claims, 8 Drawing Sheets

(56) References Cited

U.S. PATENT DOCUMENTS

| | | | |
|---|---|---|---|
| 2010/0250919 A1* | 9/2010 | Newcombe | A63F 13/12 |
| | | | 713/150 |
| 2011/0213716 A1* | 9/2011 | Ocko | A63F 13/75 |
| | | | 705/304 |
| 2014/0024447 A1* | 1/2014 | Le | A63F 13/358 |
| | | | 463/31 |
| 2014/0051521 A1* | 2/2014 | Martone | H04L 67/131 |
| | | | 463/42 |
| 2014/0148246 A1* | 5/2014 | Quan | G06F 9/4856 |
| | | | 463/24 |
| 2017/0140130 A1* | 5/2017 | Thom | H04L 9/30 |
| 2018/0034643 A1* | 2/2018 | Yang | H04L 63/166 |
| 2018/0316563 A1* | 11/2018 | Kumar | H04W 12/102 |
| 2018/0361235 A1* | 12/2018 | Hunter | H04L 67/10 |
| 2019/0288913 A1* | 9/2019 | Salgueiro | H04L 41/082 |
| 2019/0349768 A1* | 11/2019 | Fong | H04W 12/37 |
| 2020/0016494 A1* | 1/2020 | Simmer | H04L 63/08 |
| 2020/0259660 A1* | 8/2020 | Tewari | H04L 9/3236 |
| 2020/0269132 A1* | 8/2020 | Turner | G06T 19/006 |
| 2020/0322356 A1* | 10/2020 | Sheth | H04L 63/126 |
| 2021/0216636 A1* | 7/2021 | Devries | G06F 8/65 |
| 2021/0224392 A1* | 7/2021 | Baker | G06F 9/45558 |
| 2021/0240833 A1* | 8/2021 | Bae | G06F 21/572 |
| 2021/0397715 A1* | 12/2021 | Duval | G06F 9/542 |
| 2022/0126210 A1* | 4/2022 | Kumar | G06F 21/84 |

\* cited by examiner

IMPLEMENTING TRUSTED CLIENTS USING SECURE EXECUTION ENVIRONMENTS

TECHNICAL FIELD

The present disclosure is generally related to distributed computing systems, and is more specifically related to implementing trusted clients using secure execution environments.

BACKGROUND

Distributed computing systems may be utilized for performing digital content distribution, implement online gaming systems, manage Internet of Things (IoT) devices, etc. A distributed computing system may include one or more servers communicating, via public and/or private networks, to multiple client computing devices.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for implementing trusted clients using secure execution environments.

A distributed computing system may include one or more servers communicating, via public and/or private networks, to multiple client computing devices. Examples of such systems include digital content distribution systems, software distribution systems, distributed gaming systems, Internet of Things (IoT) systems, etc. Most often, the client computing devices are controlled by end users and/or third parties, and thus the party controlling the server(s) may not be able to exercise full control over the client computing devices. Therefore, a malicious end user or a third party may tamper with the software running on a client computing device and/or with the digital content received or transmitted by the client computing device. Accordingly, the client computing devices are typically treated as untrusted systems which places additional processing burden on the server(s) and/or imposes more stringent requirements to the communication channels over which the server(s) and the client computing devices communicate.

The present disclosure alleviates these and other deficiencies of various common implementations by employing trusted execution environments for implementing trusted clients. "Secure execution environment" herein refers to a hardware platform architecture or implementation that is capable of implementing an isolated execution environment providing integrity of the applications executing therein and confidentiality of their data. Accordingly, in various implementations of the present disclosure, the client computing devices may run secure execution environments that are attestable by the server, such that the server may authenticate the client platform and/or code running on the client platform.

In various illustrative examples, trusted clients implemented in accordance with aspects of the present disclosure may be employed by digital content distribution systems, software distribution systems, distributed gaming systems, Internet of Things (IoT) systems, etc. Accordingly, client applications that are executed in the secure execution environments may act as content distribution proxies with respect to peer client computing devices, as trusted game client devices, as trusted IoT devices, etc.

In an illustrative example, a client computing device running a secure execution environment may act as a digital content playback device or a game client device, and may further act as a content distribution proxy with respect to peer client computing devices, by receiving from the content distribution server and locally storing the digital content (e.g., executable files or audiovisual files or streams) that may later be accessed by one or more peer client computing devices (e.g., peer client computing devices that share a local area network with the client computing device acting as the content distribution proxy), as described in more detail herein below.

In another illustrative example, the secure execution environment implemented by a client computing device (e.g., a game client device) may be utilized by the game server to run executable code implementing at least part of the game functionality, which, by virtue of running in a secure execution environment, would be protected from being tampered with by the party having physical possession of the client computing device and/or by a third party. The ability to run a trusted executable code on the game client device may allow running interactive gaming sessions using high-latency and/or low bandwidth communication channels, which would not be adequate for conventional gaming implementations employing untrusted client computing devices, as described in more detail herein below.

In yet another illustrative example, the client computing device may be an IoT device (e.g., a video stream capturing device) which runs, in a secure execution environment, a trusted code utilized for pre-processing of the data acquired by the IoT device (e.g., audiovisual streams) before transmitting the transformed data to a server, thus relieving the latency and/or bandwidth requirements to the communication channel utilized for the transmission. The pre-processing may involve audiovisual stream compression, pattern recognition, motion detection, and/or various other functions, as described in more detail herein below.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

Figure 1:
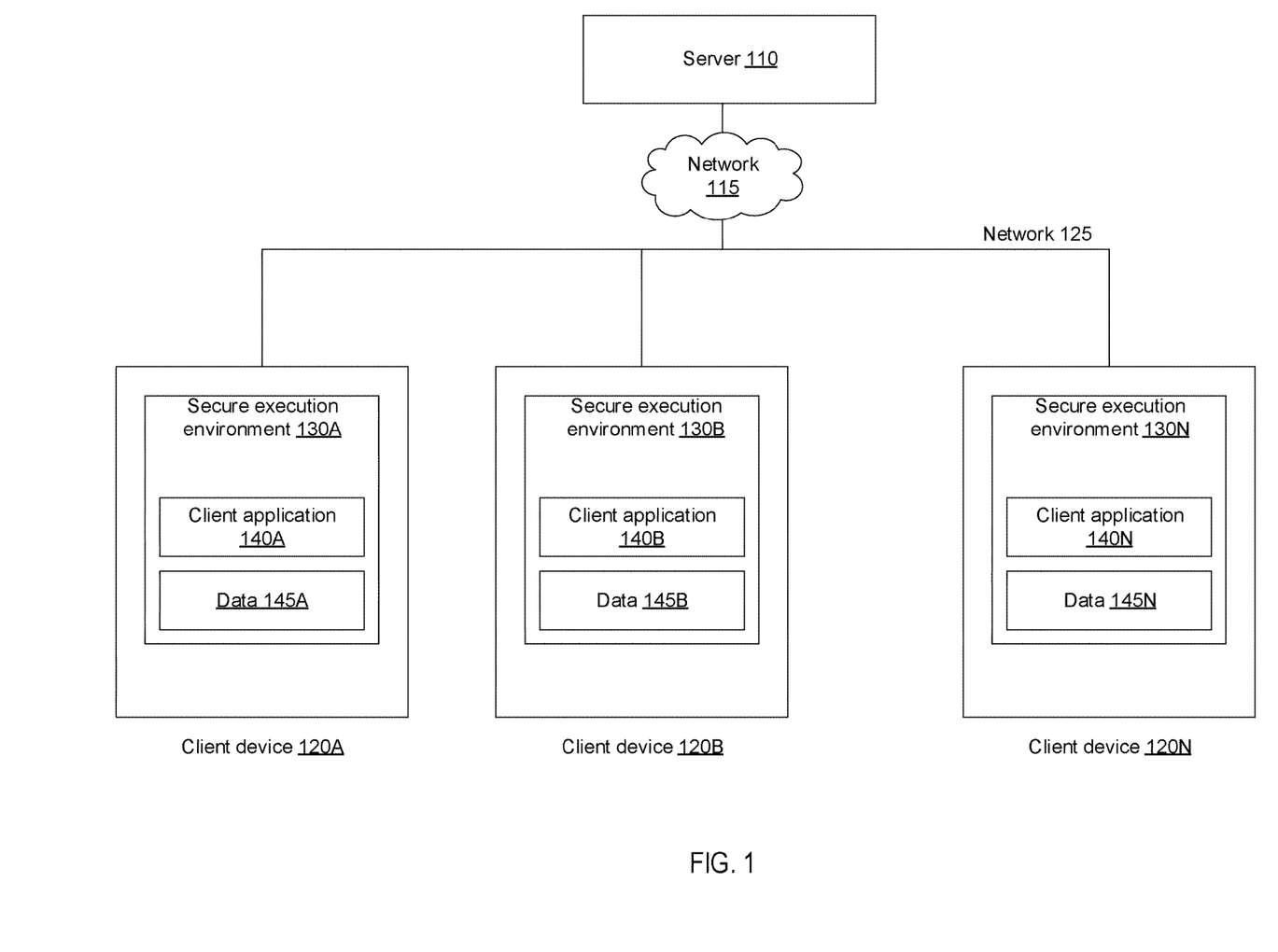
FIG. 1 depicts an example high-level component diagram illustrating a distributed computing architecture implemented in accordance with aspects of the present disclosure.

FIG. 1 depicts an example high-level component diagram illustrating a distributed computing architecture implemented in accordance with aspects of the present disclosure. As schematically illustrated by FIG. 1, the server 110 may communicate over a public communication network 115 (e.g., the Internet) with one or more client computing devices 120A-120N. In the illustrative example of FIG. 1, the client computing devices 120A-120N reside on the same network (e.g., a local area network) 125, which may be used for efficient content sharing by the peer client computing devices 120A-120N. In various illustrative examples, a client computing device 120 may be a portable communication device (such as a smartphone), a general purpose computing device (such as a personal computer), a specialized computing device (such as a gaming console), or any other suitable computing device. In various illustrative examples, the server 110 may be a content distribution server, a gaming server, a software distribution server, an IoT server, etc.

Each client computing device 120 may implement a respective secure execution environment 130. In an illustrative example, the secure execution environment 130 may be implemented by Intel® Software Guard Extensions (SGX) secure enclave, which is a private region of encrypted memory, the contents of which would only be decrypted for access by the process running within the enclave. In another illustrative example, the secure execution environment 130 may be implemented by a virtual machine running in the Intel® Trust Domain Extension (TDX) environment. In another illustrative example, the secure execution environment 130 may be implemented by the AMD® Secure Encrypted Virtualization (SEV), which encrypts the memory state of each virtual machine using a respective encryption key inaccessible by other virtual machines. Various other secure execution environment implementations for the above-referenced and/or other processor architectures may be compatible with the systems and methods of the present disclosure.

A secure execution environment, such as the secure execution environment 130A, may be utilized for running one or more client applications, such as the client application 140A. In various illustrative examples, the client application 140A may act as an audiovisual content playback client, game client, IoT sensor (e.g., performing audiovisual stream acquisition and preprocessing), and/or may perform various other functions.

In some implementations, at least part of the executable code of a client application 140 may be received from the server 110 and/or from a peer client computing device. Furthermore, at least part of the executable code of a client application 140 may be pre-installed on a client computing device 120.

The server 110 may request attestation of the client application 140 running within the secure execution environment 130. "Attestation" herein refers to a platform-specific mechanism of proving the identity of a computing process running within a secure execution environment, as well as proving that the computing process has not been tampered with and is running on a secure hardware platform. Furthermore, the server 110 may request a pre-execution measurement of the client application 140 and/or a measurement of one or more data items 145 to be utilized by the client application 140. The measurement may be performed by computing a cryptographic hash of the executable images of the client application 140 and data items 145 and/or by cryptographically signing the executable images and data items. Responsive to successfully completing the attestation and measurement procedures with respect to the client application 140 running within the secure execution environment 130, the server 110 may consider the client application 140 as a trusted code suitable for implementing various use cases, as described in more detail herein below.

Figure 2:
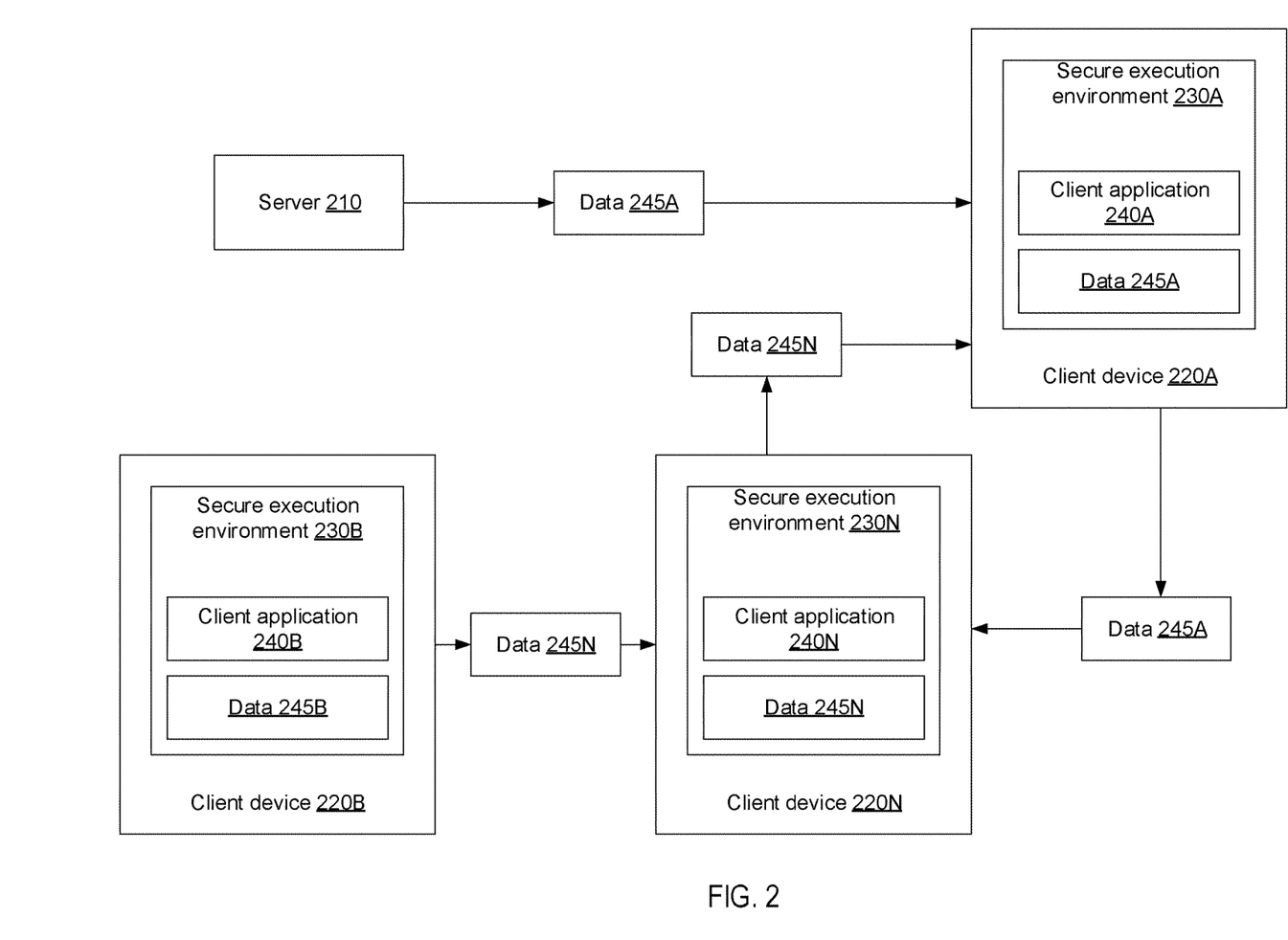
FIG. 2 schematically illustrates operation of a client computing device acting as a content distribution proxy with respect to one or more peer client computing devices, in accordance with aspects of the present disclosure.

In an illustrative example, the systems and methods of the present disclosure may be employed for audiovisual content distribution, software distribution, and gaming content distribution. As schematically illustrated by FIG. 2, the client computing device 220A acting as an audiovisual content playback device or a game client device may also act as a content distribution proxy with respect to one or more peer client computing devices 220B-220N. Each of the peer client computing devices 220B-220N may similarly run a respective client application 240B-240N in a secure execution environment 230B-230N. The content distribution server 210 (e.g., a gaming server, an audiovisual content distribution server, or a software distribution server) may, upon successfully completing the attestation and measurement procedures with respect to the client application 240A running within the secure execution environment 230A of the client computing device 220A, transmit to the client computing device 220A one or more confidential data items 245, which the client computing device 220A may store in its local memory (e.g., in the encrypted memory region 220A associated with the secure execution environment 230A). In various illustrative examples, the confidential data items 245 may represent audiovisual content items, executable code, etc., which may be shared by the client computing device 220A with one or more peer client computing devices 220B-220N. In some implementations, a peer client computing device 220N may transmit to the client computing device 220A a request for a specified confidential data item 245. The request may identify the requested data item 245 by its file name, hash value of the content, and/or any other suitable identifier. Responsive to receiving the request, the client computing device 220A may transmit, over an encrypted communication channel, the requested data item 245 to the peer client computing device 220N.

In some implementations, the client computing device 220N may in turn implement the content distribution proxy functionality with respect to other peer client computing devices 220. In the illustrative example of FIG. 2, the client computing device 220N receives, from the content distribution server 210, one or more confidential data items 245N and forwards the received data items to one or more peer client computing devices, including the client computing device 220A and the client computing device 220B. Thus, each of the client computing devices 220 may receive, from the content distribution server 210, one or more confidential data items 245, and may receive other confidential data items from one or more peer client computing devices 220. Employing client computing devices 220 as content distribution proxies may thus relieve the latency and/or bandwidth requirements to the communication channel between each of the client computing devices 220 and the content distribution server 210.

Figure 3:
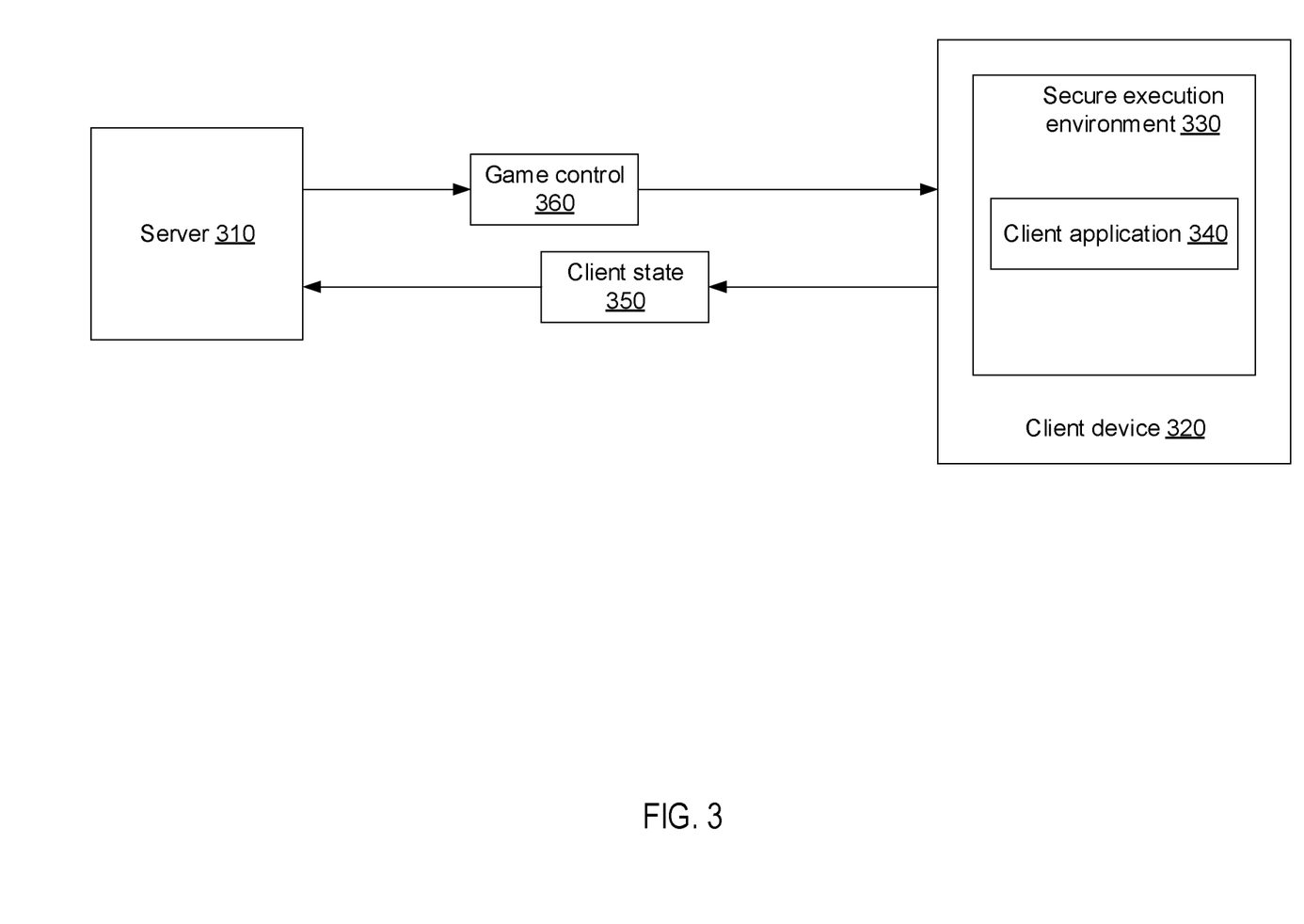
FIG. 3 schematically illustrates operation of a trusted game client implemented in accordance with aspects of the present disclosure.

In another illustrative example, the systems and methods of the present disclosure may be employed for implementing trusted game clients. As schematically illustrated by FIG. 3, the game client device 320 (e.g., a gaming console, a portable communication device such as a smartphone, etc.) runs, in the secure execution environment 330, a trusted game client application 340. In some implementations, at least part of the executable code implemented by the game client application 340 may be received from the game server 330. In some implementations, at least part of the executable code implemented by the game client application 340 may be received from a provisioning server or from a peer client computing device (not shown in FIG. 3).

Responsive to successfully completing the attestation and measurement procedures with respect to the game client application 340 running within the secure execution environment 330, the server 330 may send to and/or receive from the game client application 340 confidential data items reflecting the updates of the game server state and the game client state. For example, responsive to receiving a user interface input (e.g., via one or more joysticks of the gaming console), the client computing device 320 may accordingly update its internal state, and may transmit, to the game server 330, one or more client state messages 350 comprising at least part of the updated game client state. The game server 330, responsive to receiving the updated game client state, may accordingly update its internal state, and may transmit, to the game client device 320, one or more game control messages 360 reflecting the updated game server state.

In some implementations, the game client device 320 may further act as a game content distribution proxy with respect to one or more peer client computing devices (not shown in FIG. 3), by serving to the peer client computing devices the executable code, audiovisual content, and/or game state data that have been previously received from the game server 330, as described in more detail herein above with references to FIG. 2.

Figure 4:
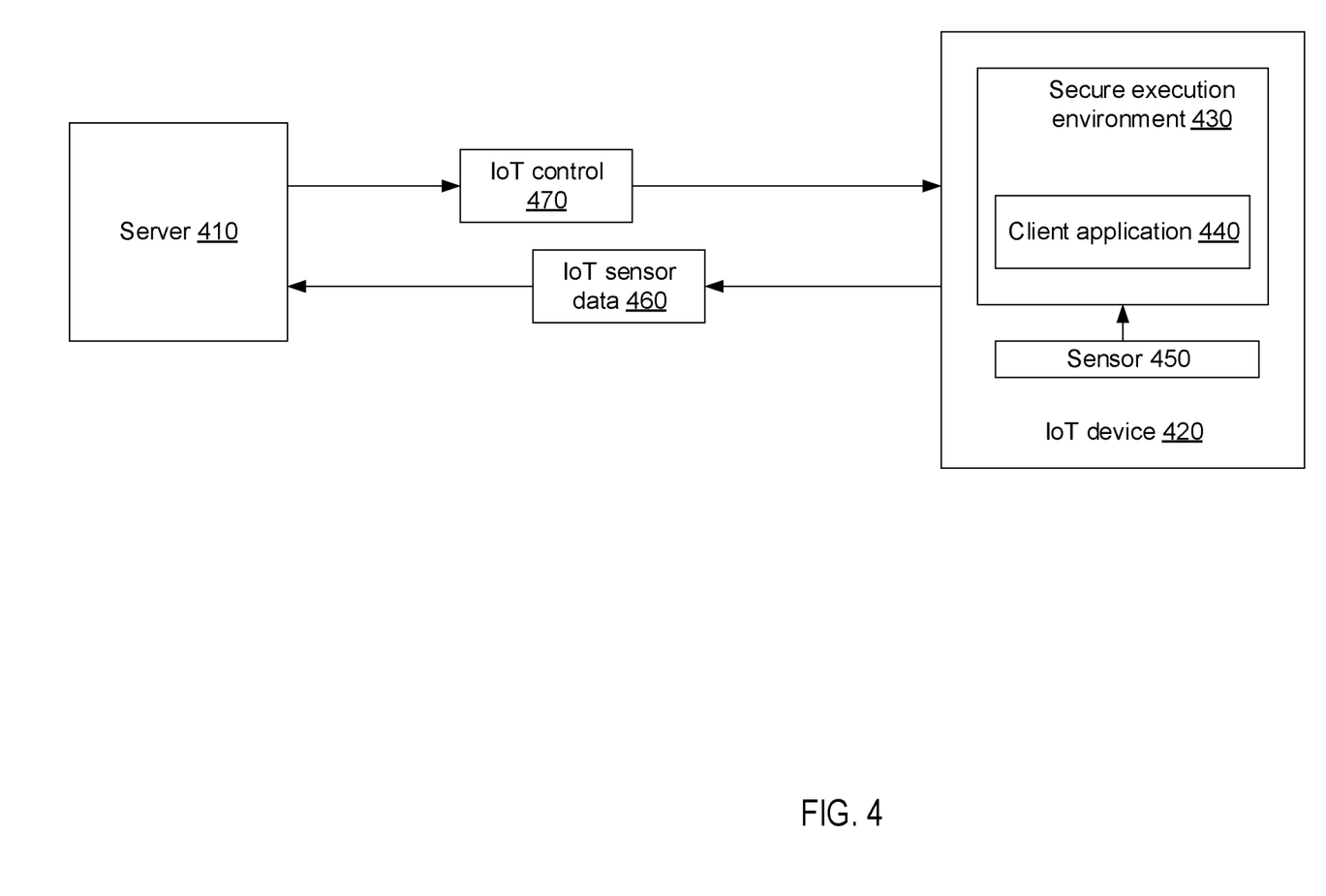
FIG. 4 schematically illustrates operation of an IoT device implemented in accordance with aspects of the present disclosure.

In yet another illustrative example, the systems and methods of the present disclosure may be employed for implementing trusted IoT clients. As schematically illustrated by FIG. 4, the IoT device 420 (e.g., a video stream capturing device) runs, in the secure execution environment 430, a trusted IoT client application 440. In some implementations, the executable code implemented by the IoT client application 440 may be received from the IoT server 440. Alternatively, the executable code implemented by the IoT client application 440 may be received from a provisioning server (not shown in FIG. 3) or from a peer IoT device 420B-420N.

Responsive to successfully completing the attestation and measurement procedures with respect to the IoT client application 440 running within the secure execution environment 430, the IoT server 440 may send confidential data to the IoT client application 440, e.g., the control and configuration data 470 for one or more IoT client computing devices 420.

In some implementations, the IoT client application 440 may be employed for pre-processing of the sensor data (e.g., a video stream) acquired by the sensor 450 (e.g., a video camera). The pre-processing may involve video stream compression, pattern recognition, motion detection, and/or various other functions. The transformed sensor data (e.g., transformed video stream) 460 may be transmitted to the IoT server 410.

In some implementations, the IoT device 420 may further act as a content distribution proxy with respect to one or more peer IoT devices, by serving to the peer IoT devices the executable code and/or configuration data that have been previously received by the IoT device from the IoT server 410, as described in more detail herein above with references to FIG. 2.

Figure 5:
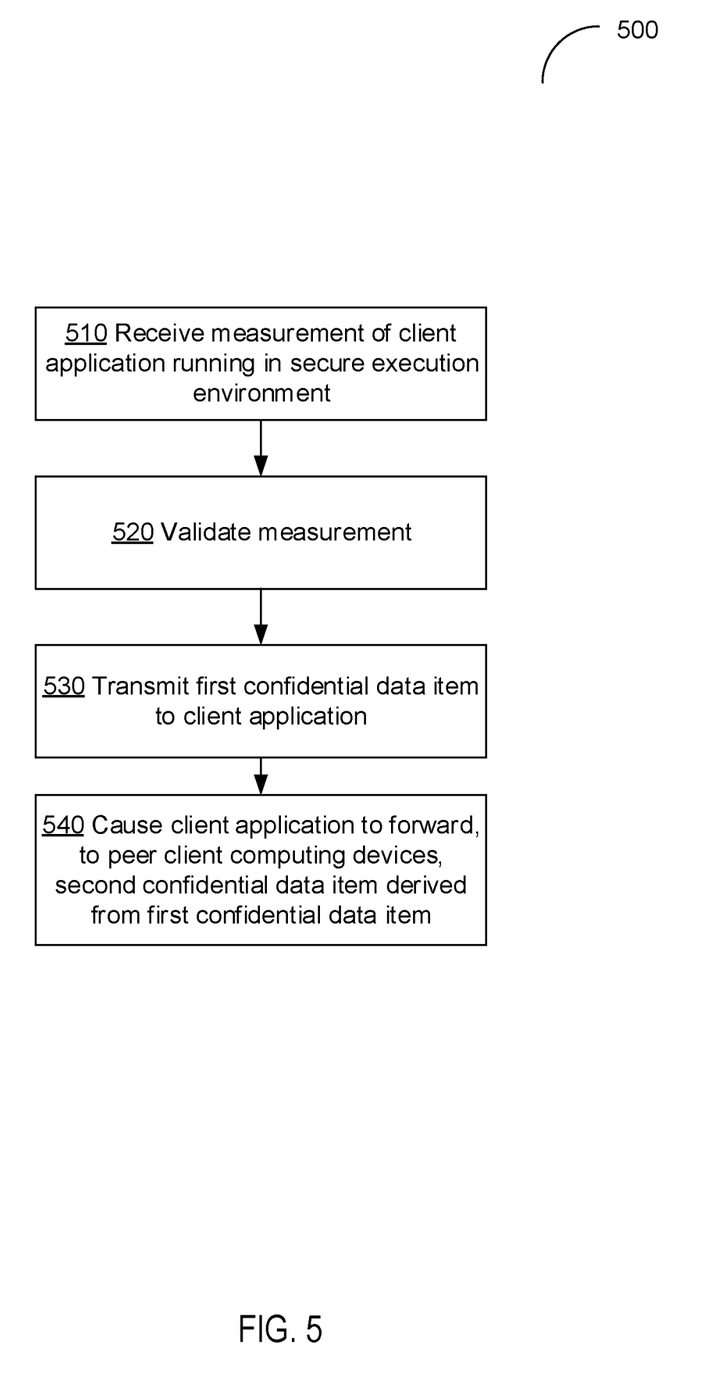
FIG. 5 depicts a flowchart of an example method of digital content distribution using a trusted client application running in a secure execution environment, in accordance with one or more aspects of the present disclosure.

FIG. 5 depicts a flowchart of an example method 500 of digital content distribution using a trusted client application running in a secure execution environment, in accordance with one or more aspects of the present disclosure. The method 500 may be performed by the servers 110, 210, 310 of FIGS. 1-3. In some implementations, method 500 may be performed by a single processing thread executed by a processing device. Alternatively, method 500 may be performed by two or more processing threads executed by one or more processing devices, such that each thread would execute one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Therefore, while FIG. 5 and the associated description lists the operations of method 500 in certain order, various implementations of the method may perform at least some of the described operations in parallel and/or in arbitrary selected orders.

At block 510, the computing system implementing the content distribution server receives a measurement from an application running in a secure execution environment implemented by a client computing device. In various illustrative examples, the client computing device may be a portable communication device (such as a smartphone), a general purpose computing device (such as a personal computer), a specialized computing device (such as a gaming console), or any other suitable computing device. The measure computed by the secure execution environment may reflect a pre-execution measurement of one or more computing processes residing in the secure execution environment and implementing the application and/or a measurement of one or more data items to be utilized by those computing processes. The measurement may be performed by computing a cryptographic hash of the executable images of the computing processes and the data items and/or by cryptographically signing the executable images and data items.

Responsive to successfully validating the measurement at block 520, the computing system transmits, at block 530, a first confidential data item to the application running in the secure execution environment. In an illustrative example, the first confidential data item may contain an audiovisual content item. In another illustrative example, the first confidential data item may contain an executable code to be run by the client computing device. In yet another illustrative example, the first confidential data item may contain a configuration message and/or control message issued by the server to the client computing device. In yet another illustrative example, the first confidential data item may contain at least part of a state of a game session, as described in more detail herein above.

At block 540, the computing system causes the application running in the secure execution environment to forward, to a peer client computing device, the first confidential data item and/or a second confidential data item derived from the first confidential data item. In an illustrative example, the client computing device may implement a content distribution proxy with respect to peer client computing devices. In some implementations, each digital content item and/or executable code item transmitted by the server to the client computing device may have metadata indicating whether the content item may be forwarded to peer client computing devices. In some implementations, the client computing device may forward the received confidential data items to one or more peer client computing device. In other implementations, the client computing device may transform the received confidential data items and forward the transformed confidential data items to the peer client computing devices. Transforming the confidential data items may involve performing data compression, encoding, decoding, splitting a data item into two or more data items, combining two or more data items into a single data item, and/or performing various other data transformation operations. Responsive to completing the operation of block 540, the method terminates.

Figure 6:
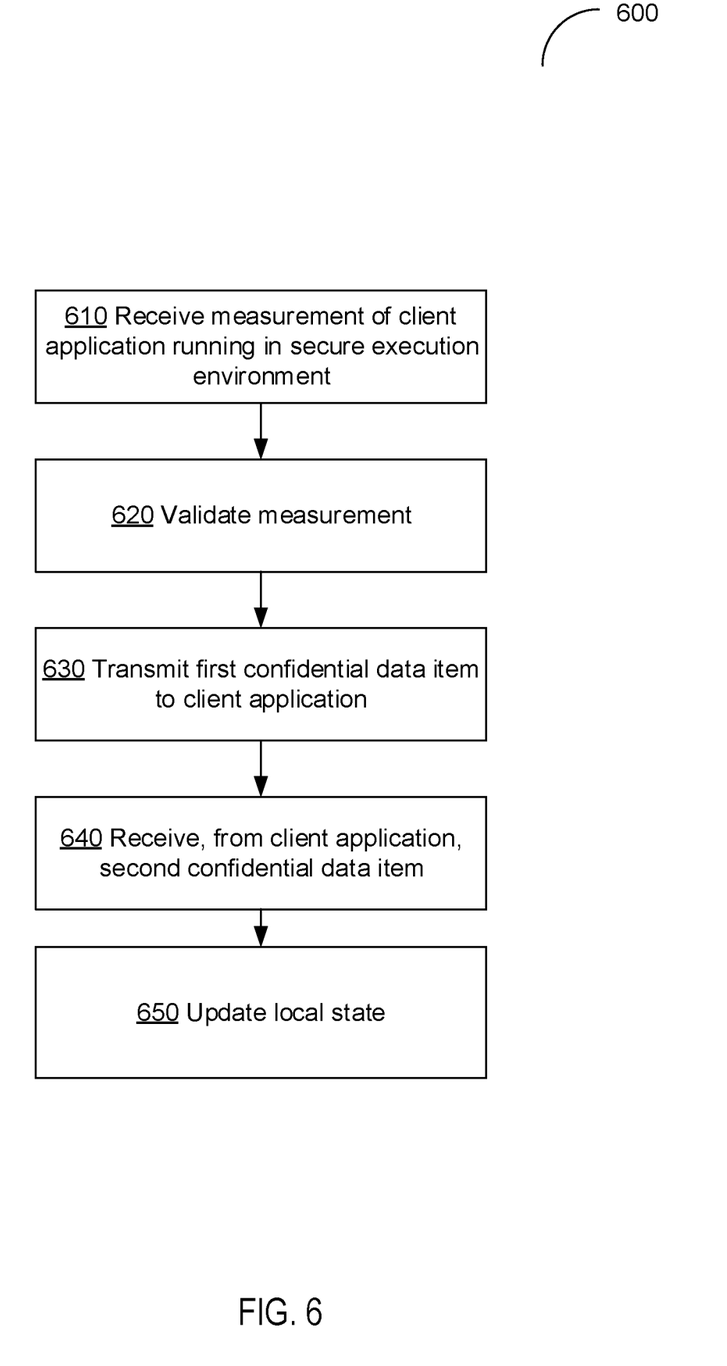
FIG. 6 depicts a flowchart of an example method of implementing a trusted game client by a secure execution environment, in accordance with one or more aspects of the present disclosure.

FIG. 6 depicts a flowchart of an example method 600 of implementing a trusted game client by a secure execution environment, in accordance with one or more aspects of the present disclosure. The method 600 may be performed by the game server 310 of FIG. 3. In some implementations, method 600 may be performed by a single processing thread executed by a processing device. Alternatively, method 600 may be performed by two or more processing threads executed by one or more processing devices, such that each thread would execute one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel and/or in arbitrary selected orders.

At block 610, the computing system implementing the game server receives a measurement from a game client application running in a secure execution environment implemented by a client computing device. In various illustrative examples, the client computing device may be a portable communication device (such as a smartphone), a general purpose computing device (such as a personal computer), a specialized computing device (such as a gaming console), or any other suitable computing device. The measure computed by the secure execution environment may reflect a pre-execution measurement of one or more computing processes residing in the secure execution environment and implementing the game client application and/or a measurement of one or more data items to be utilized by those computing processes. The measurement may be performed by computing a cryptographic hash of the executable images of the computing processes and the data items and/or by cryptographically signing the executable images and data items.

Responsive to successfully validating the measurement at block 620, the computing system transmits, at block 630, a first confidential data item to the game client application running in the secure execution environment. In an illustrative example, the first confidential data item may contain an audiovisual content item to be utilized by the game client application. In another illustrative example, the first confidential data item may contain an executable code to be run by the client computing device. In yet another illustrative example, the first confidential data item may contain a configuration message and/or control message issued by the game server to the game client application. In yet another illustrative example, the first confidential data item may contain at least part of a state of a game session, as described in more detail herein above.

At block 640, the computing system receives, from the game client application, a second confidential data item derived from a local state of the client application modified by the first confidential data item. In an illustrative example, responsive to receiving the first confidential data item (e.g., containing a configuration message and/or control message issued by the game server to the game client application), the game client application modifies its local state (e.g., by updating the local configuration based on the configuration message specifying values of one or more configuration parameters, and/or by performing one or more actions specified by the control message). The game client further derives the second confidential data item from the modified local state, and transmits the second confidential data item back to the game server. In an illustrative example, the second confidential data item may contain at least part of a state of a game session, e.g., values of one or more parameters of the game session which have been modified in response to receiving the configuration message from the game server and/or in response to receiving one or more user interface inputs, e.g., via one or more joysticks of the gaming console. Responsive to receiving a user interface input, the client computing device may accordingly update its local state, and may transmit, to the game server, one or more confidential data items comprising at least part of the updated game client state.

At block 650, the computing system updates the server state based on the second confidential data item receives from the game client application. In an illustrative example, the game session state maintained by the server may be updated to reflect the user interface inputs that have been encoded by one or more confidential data items received from the game client at block 640. Responsive to completing the operation of block 650, the method terminates.

Figure 7:
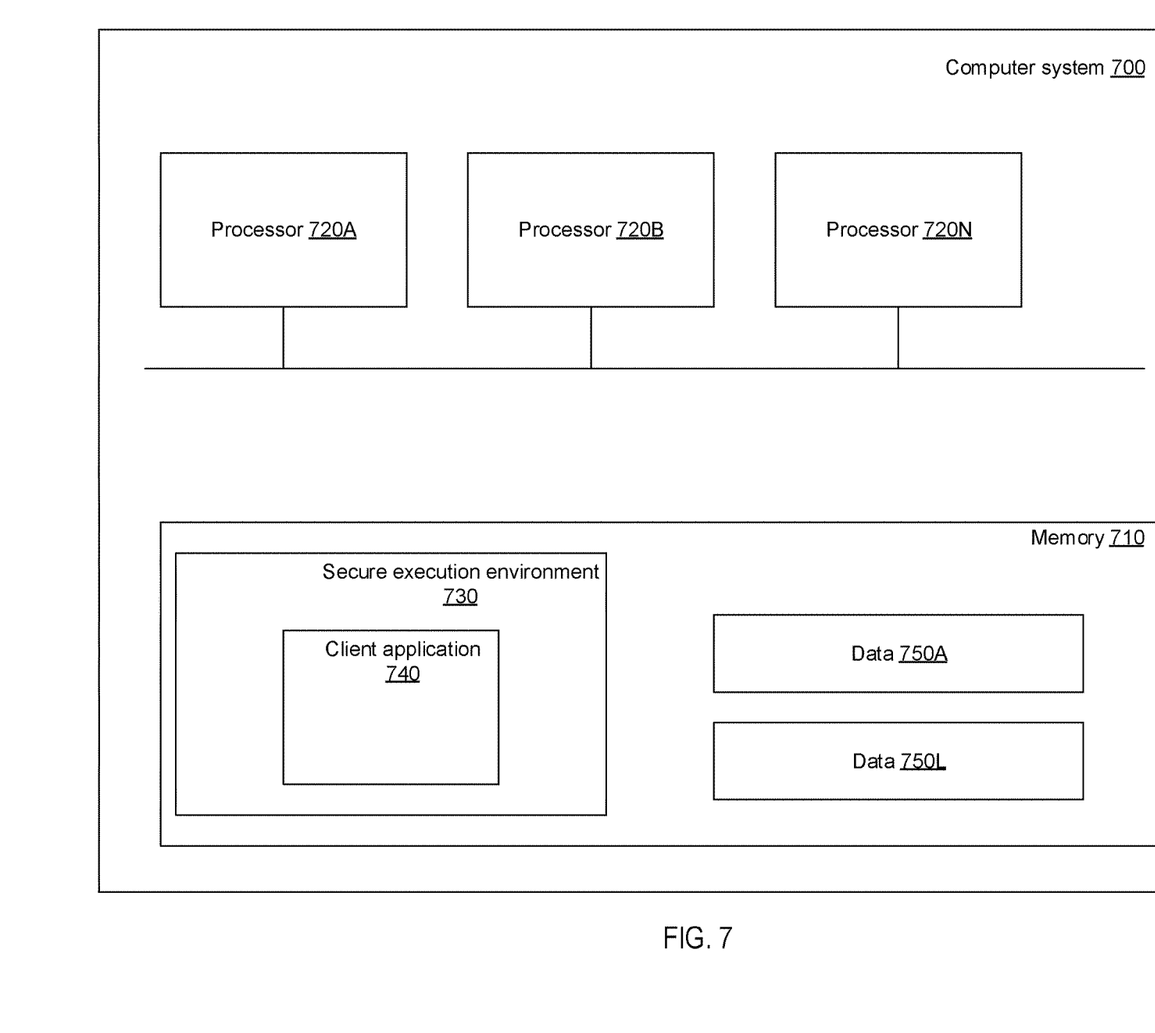
FIG. 7 depicts a block diagram of an example computer system operating in accordance with one or more aspects of the disclosure.

FIG. 7 depicts a block diagram of an example computer system 700 operating in accordance with one or more aspects of the disclosure. In various implementations, computer system 700 may perform the functions of the client computing device 120, 220, 320 of FIGS. 1-3. Computer system 700 comprises a memory 710 and one or more physical processors 720A-720N that are operatively coupled to the memory 710 and execute, within the secure execution environment 730, the code implementing the functionality of the client computing device, as described in more detail herein above. In an illustrative example, the secure execution environment may be implemented by Intel® SGX secure enclave, which is a private region of encrypted memory, the contents of which would only be decrypted for access by the process running within the enclave. In another illustrative example, the secure execution environment may be implemented by a virtual machine running in the Intel® TDX environment. In another illustrative example, the secure execution environment may be implemented by the AMD® SEV, which encrypts the memory state of each virtual machine using a respective encryption key inaccessible by other virtual machines. The memory 710 may further store one or more data items 750A-750L received from the server and/or from peer client computing devices, as described in more details herein above.

Figure 8:
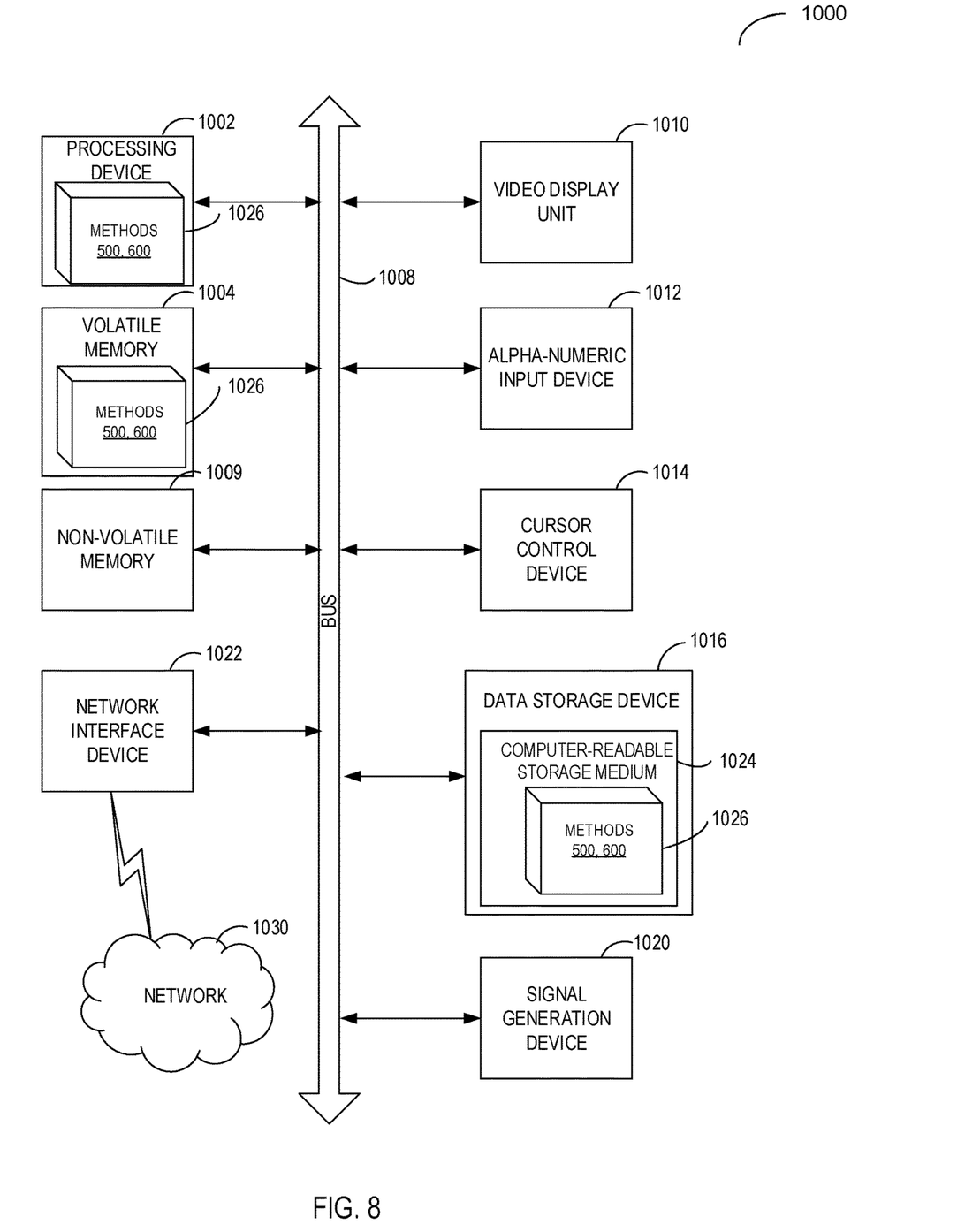
FIG. 8 depicts a high-level component diagram of an example computer system which may be employed to implement the systems and methods described herein.

FIG. 8 depicts a high-level component diagram of an example computer system which may be employed to implement the systems and methods described herein. In various implementations, computer system 1000 may perform the functions of host computer system 120 of FIG. 1. In some implementations, computer system 1000 may be connected (e.g., via a network 1030, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processing device 1002, a volatile memory 1004 (e.g., random access memory (RAM)), a non-volatile memory 1009 (e.g., read-only memory (ROM) or electrically-erasable programmable ROM (EEPROM)), and a data storage device 1016, which may communicate with each other via a bus 1008.

Processing device 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a cursor control device 1014 (e.g., a mouse), and a signal generation device 1020.

Data storage device 1016 may include a non-transitory computer-readable storage medium 1024 on which may store instructions 1026 encoding any one or more of the methods or functions described herein, including instructions for implementing method 500 of digital content distribution using a trusted client application running in a secure execution environment and/or method 600 of implementing a trusted game client by a secure execution environment, in accordance with aspects of the present disclosure.

Instructions 1026 may also reside, completely or partially, within volatile memory 1004 and/or within processing device 1002 during execution thereof by computer system 1000, hence, volatile memory 1004 and processing device 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400, 500 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
  receiving, by an Internet-of-Things (IoT) server, a pre-execution measurement from an IoT client application running in a secure execution environment implemented by an IoT client computing device, wherein the pre-execution measurement is performed by cryptographically signing an executable image of the IoT client application and a data item utilized by the IoT client application;
  responsive to validating the pre-execution measurement, transmitting a first confidential data item to the client application running in the secure execution environment, wherein the first confidential data item comprises control and configuration data associated with the IoT client application, and wherein the first confidential data item comprises executable code for pre-processing sensor data acquired by the IoT client device;

causing the IoT client application running in the secure execution environment to forward the first confidential data item to a peer IoT client computing device; and receiving, from the IoT client application running in the secure execution environment, a second confidential data item derived by the IoT client application based on the first confidential data item.

2. The method of claim 1, further comprising:

causing the IoT client application running in the secure execution environment to forward, to a peer IoT client computing device, a third confidential data item derived from the first confidential data item.

3. A computer system, comprising:

a memory; and a computing device coupled to the memory, the computing device to:

receive a pre-execution measurement from an IoT client application running in a secure execution environment implemented by an Internet-of-Things (IOT) client computing device, wherein the pre-execution measurement is performed by cryptographically signing an executable image of the IoT client application and a data item utilized by the IoT client application;

responsive to validating the pre-execution measurement, transmit a first confidential data item to the client application running in the secure execution environment, wherein the first confidential data item comprises control and configuration data associated with the IoT client application, and wherein the first confidential data item comprises executable code for pre-processing sensor data acquired by the IoT client device;

cause the IoT client application running in the secure execution environment to forward the first confidential data item to a peer IoT client computing device; and receive, from the IoT client application running in the secure execution environment, a second confidential data item derived by the IoT client application based on the first confidential data item.

4. The system of claim 3, wherein the computing device is further to:

cause the IoT client application running in the secure execution environment to forward, to a peer IoT client computing device, a third confidential data item derived from the first confidential data item.

5. A non-transitory computer-readable storage medium comprising executable instructions that, when executed by a processing device of a server, cause the processing device to:

receive a pre-execution measurement from an IoT client application running in a secure execution environment implemented by an Internet-of-Things (IOT) client computing device, wherein the pre-execution measurement is performed by cryptographically signing an executable image of the IoT client application and a data item utilized by the IoT client application;

responsive to validating the pre-execution measurement, transmit a first confidential data item to the client application running in the secure execution environment, wherein the first confidential data item comprises control and configuration data associated with the IoT client application, and wherein the first confidential data item comprises executable code for pre-processing sensor data acquired by the IoT client device;

cause the IoT client application running in the secure execution environment to forward the first confidential data item to a peer IoT client computing device; and receive, from the client application running in the secure execution environment, a second confidential data item derived by the IoT client application based on the first confidential data item.

6. The non-transitory computer-readable storage medium of claim 5, further comprising executable instructions that, when executed by the processing device of a server, cause the processing device to:

cause the IoT client application running in the secure execution environment to forward, to a peer IoT client computing device, a third confidential data item derived from the first confidential data item.

* * * * *